May 14, 1957 W. D. O'NEIL 2,792,055
CUSHION POCKET
Filed Jan. 13, 1954
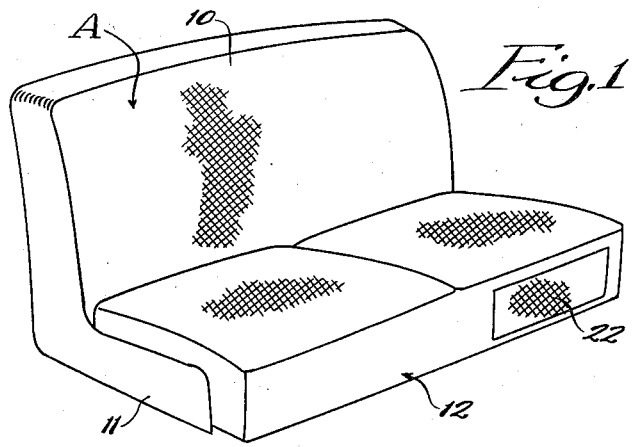
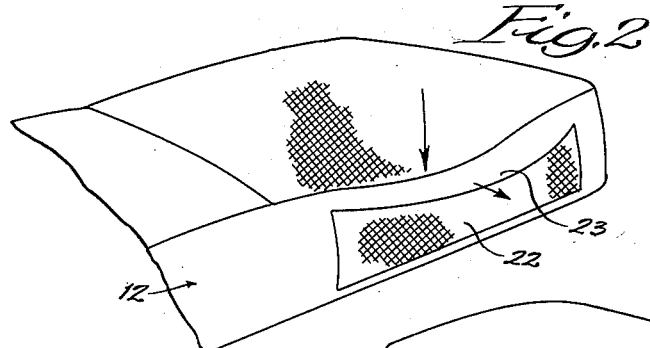
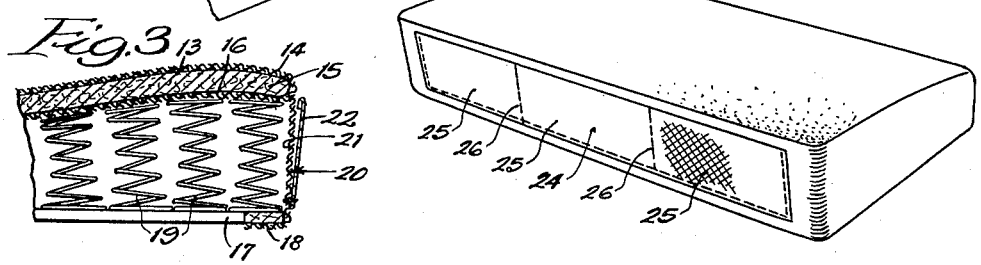
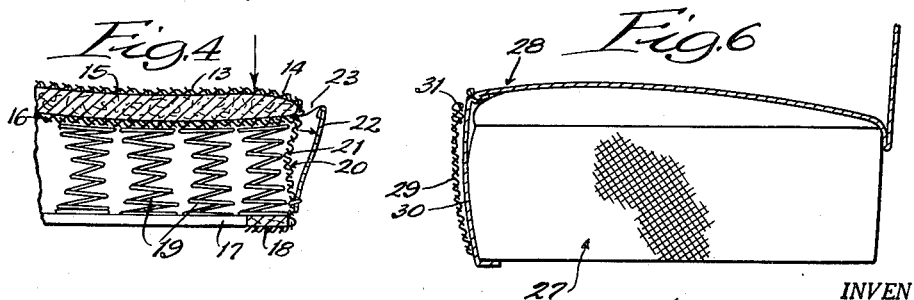
INVENTOR:
William D. O'Neil,
BY
Dawson, Tilton & Graham,
ATTORNEYS.

United States Patent Office 2,792,055
Patented May 14, 1957

2,792,055
CUSHION POCKET

William D. O'Neil, Santa Monica, Calif.

Application January 13, 1954, Serial No. 403,691

1 Claim. (Cl. 155—184)

This invention relates to a cushion pocket and, more particularly, to a pocket provided along the forward wall of a compressible seat cushion such as the seat cushion of an automobile and which is adapted to provide a receptacle for holding articles such as glasses, maps, keys, gloves, etc.

There has long been a need for a cushion pocket particularly suitable for use on automobile seat cushions which has a readily accessible mouth when a person is seated upon the cushion so that articles within the pocket can easily be withdrawn therefrom and which provides a closed mouth when the weight is removed from the cushion so that the presence of the pocket is, for the most part, concealed. Not only would such a pocket along the forward wall of an automobile seat cushion be desirable because of its ready availability which would make unnecessary the reaching across the front seat of an automobile to enter the glove compartment where small articles are normally stored, but it would further be desirable if, when the seat was not in use, the presence of the pocket were concealed for then articles of value could be kept within the pocket and the danger of loss from theft, etc. would be considerably minimized. For example, if an unauthorized person entered an automobile equipped with the seat cushion pocket, such person would immediately look in the glove compartment, on the seats, and perhaps on the back shelf of the automobile for valuables, but would overlook the pocket and articles carried therein because it would not be readily visible.

It is accordingly an object of this invention to provide a seat pocket structure to fulfill the need described above. Another object of the invention is to provide a cushion pocket structure wherein the mouth of the pocket is open and the interior thereof readily accessible when a person is seated upon the cushion, but wherein the mouth is closed and drawn tightly against the seat cushion when the weight of a person is removed therefrom whereby the pocket is then substantially concealed. Still another object of the invention is in providing a strip of material along the forward wall of a seat cushion, the cushion being resilient whereby when a weight is imposed thereon the mouth of the pocket is open and when the weight is removed therefrom the forward wall of the seat is extended to substantially close the pocket. Yet another object is in the provision of a pocket as described above which is compartmented. A further object of the invention is to provide seat covers adapted for use with the resilient seats of automobiles and which are provided with a pocket that is oriented along the forward wall of the cushion when the seat covers are in place, whereby the pocket is normally closed and concealed but wherein the mouth of the pocket is open when a weight is imposed upon the cushion. Additional objects and advantages will appear as the specification proceeds.

Embodiments of the invention are illustrated in the accompanying drawing, in which—

Fig. 1 is a perspective view of a seat embodying my invention; Fig. 2 is a broken perspective view showing the condition of the seat and pocket when a weight is imposed upon the seat; Fig. 3 is a broken transverse sectional view of a seat incorporating the pocket of my invention; Fig. 4 is a broken cross-sectional view similar to that of Fig. 3, but showing the condition of the seat and pocket when a weight is imposed upon the seat; Fig. 5 is a perspective view showing a modified form of pocket; and Fig. 6 is an end view in elevation of a seat cushion equipped with a seat cover incorporating a pocket in accordance with this invention.

In Fig. 1, a seat is illustrated in perspective and is designated generally with the letter A. The seat A may be of any desired character and construction and may be a chair, sofa, etc., but is preferably the seat of an automobile. The seat A provides a back 10 equipped at its lower end with forwardly-extending frame portions 11 into which the cushion 12 is inserted and is brought along the rear edge thereof into contiguous relation with the back 10. The cushion 12 may be elongated and extend throughout the width of the back 10, or it may be split so that in effect two separate cushions are provided. Similarly, the back 10 may be of one piece construction, as illustrated, or may be formed in two sections or may have any other desired construction.

The cushion 12 should be yieldable and resilient so that it is compressed slightly when a person is seated thereon but returns to normal condition when the weight is removed therefrom. Such cushions are almost universal in automobiles today and while a description and illustration of such a cushion is therefore unnecessary, Figs. 3 and 4 show a possible construction thereof. It is noted in Fig. 3 in particular that the cushion 12 is provided with a top wall 13 formed by fabric 14 which encloses a padding 15 and which rests on its under side upon a spring cover 16. A relatively rigid bottom wall 17 is provided and this may be solid or formed by webbnig which is secured to a peripheral frame 18. A plurality of coil springs 19 rest upon the bottom wall 17 and bear upwardly against the spring cover 16, padding 15, and fabric 14. The cushion 12 further provids side walls and a forward wall 20 that is preferably covered with a fabric 21.

As is seen in Figs. 1 through 5, the forward wall 20 of the cushion 12 is provided with a pocket 22 which may be formed from an elongated strip of material extending longitudinally along the forward wall and which is secured thereto along the bottom edge and side edges of the strip. The top edge of the strip is left unsecured so that a mouth or access opening 23 is provided.

Any desired material may be used to form the pocket 22. For example, any fabric may be used or, if desired, a plastic or leather or other material may be readily employed. Similarly, any means suitable for the purpose may be used to anchor the side edges and bottom edge of the pocket to the forward wall of the cushion. For example, if a fabric is employed it may be most desirable to sew the pocket-forming strip of material to the forward wall of the cushion, while if a plastic is used to form the pocket and the fabric closing the seat cushion is also plastic (assuming both are thermoplastics), the strip of material may be heat welded to the material of the seat. In some instances, it may be desirable to provide a removable pocket and in this event zippers may be employed for securing the strip of material to the forward wall of the seat cushion.

The strip of material forming the pocket 22 may be secured only at the bottom and side edges thereof wherein a single pocket compartment is formed, or the strip of material may be secured along spaced vertical lines intermediate the ends thereof to provide a plurality of compartments within the pocket. Fig. 5 is representative of the latter construction and in this modification it is seen that the pocket 24 is provided with a plurality of compartments 25 formed by securing the elongated strip of material intermediate the ends thereof along the vertical lines 26.

If desired, and perhaps in some instances a preferable construction, is to provide a seat cushion 27 with a seat cover 28 having a pocket 29 formed along the portion thereof that falls along the forward wall 30 of the cushion 27 when the seat covers 28 are in place. It will be appreciated that the seat covers 28 may be formed of any of the conventional materials used for this purpose and, if desired, from many other materials. Similarly, the pocket 29 may be provided by securing an elongated strip of material to the seat cover, or the seat cover may be appropriately slitted, as is illustrated, to provide a mouth 31 wherein the pocket is actually provided between a wall of the seat cover and the forward wall 30 of the seat 27.

The construction and positioning of the seat cushion pockets, whether formed directly on the fabric covering the seat cushion or in a seat cover adapted to enclose the cushion, is such that the upper edge of the pocket is drawn tightly against the forward wall of the cushion when there is no weight upon the cushion and it is in the normal condition. Figs. 1, 3, 5, and 6 illustrate the configuration of the pockets when the forward wall of a seat cushion is extended.

On the other hand, when a weight is imposed upon a seat cushion the forward wall thereof yields downwardly and inwardly in a longitudinal direction along the top portion of the forward wall and this movement is operative to relax the tension upon the upper edge of the pocket and the pocket therefore falls forwardly so that the mouth thereof is open and ready access to the interior of the pocket is provided. Figs. 2 and 4 illustrate the forward wall of the cushion pressed downwardly along its top portion when a weight is placed on the top wall of the cushion above the pocket, and also show the side walls directed inwardly and longitudinally in relation to the top portion of the forward wall causing the mouth of the pocket to drop open. It will be apparent that when articles are received within the pocket, the weight of such articles will be operative to facilitate the forward movement of the pocket so that the upper edge or mouth thereof is away from the forward wall of the cushion.

I have provided a very simple structure that accomplishes the desirable result of providing a readily accessible pocket along the forward wall of an automobile seat cushion so that the driver of the automobile can, with ease, reach glasses and maps, etc. While when a weight is imposed upon the seat the mouth of the pocket is therefore open, when the weight is removed from the seat the forward wall thereof springs upwardly and the mouth of the pocket is drawn closed whereby articles are securely held within the pocket and the pocket is thus substantially concealed.

While in the foregoing specification embodiments of the invention have been set out in considerable detail for purposes of illustration, it will be apparent to those skilled in the art that considerable deviation may be made in these details without departing from the spirit and principles of the invention.

I claim:

In combination with a motor vehicle seat cushion having top, forward and side walls, said forward wall being yieldable downwardly and inwardly and said side walls being yieldable inwardly and longitudinally with reference to the top portion of the forward wall when a weight is imposed upon the top wall of the cushion, an outer cover extending over the walls of said cushion and being normally drawn relatively tightly over the forward wall thereof, a pocket comprising a horizontally elongated strip of relatively inelastic, flexible material secured along the side and bottom edges thereof to the portion of said outer cover extending over said forward wall, said strip having a free top edge providing a mouth for said pocket and being normally drawn by said cushion and cover against the portion of said cover extending over the top portion of said forward wall, whereby, when a weight is imposed upon the top wall of said cushion above said pocket, said forward wall is compressed and said side walls yield inwardly and longitudinally with reference to the top portion of said forward wall to flex the top edge of said inelastic strip and thereby open the mouth of said pocket.

References Cited in the file of this patent

UNITED STATES PATENTS

| | | |
|---|---|---|
| 137,738 | Trevitt | Apr. 8, 1873 |
| 963,757 | Greer | July 12, 1910 |
| 1,518,672 | O'Connell | Dec. 9, 1924 |
| 2,319,431 | Owen | May 18, 1943 |
| 2,646,579 | Bows | July 28, 1953 |

FOREIGN PATENTS

| | | |
|---|---|---|
| 777,347 | France | Nov. 26, 1934 |